May 30, 1967  E. R. KENDALL ET AL  3,321,967
AIRCRAFT INSTRUMENTS
Filed April 21, 1964  4 Sheets-Sheet 2

INVENTORS:
ERIC RAYMOND KENDALL
AND
STANLEY BERNARD NEWPORT
ATTORNEYS:
Moore, Hall & Pollack

FIG. 3.

May 30, 1967 E. R. KENDALL ETAL 3,321,967
AIRCRAFT INSTRUMENTS
Filed April 21, 1964 4 Sheets-Sheet 4

FIG.5.

INVENTORS:
ERIC RAYMOND KENDALL
AND
STANLEY BERNARD NEWPORT

ATTORNEYS:
Moore, Hall & Pollack

United States Patent Office 3,321,967
Patented May 30, 1967

3,321,967
AIRCRAFT INSTRUMENTS
Eric Raymond Kendall, Woodmancote, Cheltenham, and Stanley Bernard Newport, Prestbury, Cheltenham, England, assignors to S. Smith & Sons (England) Limited, London, England, a British company
Filed Apr. 21, 1964, Ser. No. 361,404
Claims priority, application Great Britain, Apr. 25, 1963, 16,353/63; Nov. 28, 1963, 47,121/63
35 Claims. (Cl. 73—178)

The present invention relates to aircraft instruments.

It is becoming increasingly necessary to provide fast modern aircraft with instruments that are designed speccificially to deal with certain critical flight maneuvers and present to the pilot information regarding the action he must take. One such critical maneuver is that of take-off when the aircraft has to be handled with precision in order that the flight path shall be well above obstacles on the ground and yet not at any stage so steep that the aircraft fails to gain sufficient speed for safe flight. Economic considerations, particularly with jet aircraft, do not permit the use of liberal safety margins during take-off, and currently the pilot can rely only on his air speed and attitude displays to help him in the exacting task of achieving an acceptable flight path. The task of course becomes even more exacting if power loss or some other emergency condition arises.

A form of aircraft instrument which may be used to assist a pilot in achieving an acceptable flight path, especially during take-off, is described in co-pending U.S. patent application Serial No. 326,654, filed November 18, 1963, in the names of R. I. Bishop, E. R. Kendall, and R. A . Palmer. This instrument in broad terms, comprises means for providing a signal dependent upon forward acceleration of the aircraft, means for providing a signal dependent upon rate of change of pitch attitude of the aircraft, and means which is arranged to be responsive to both signals for providing an indication which is dependent upon difference between said rate of change of pitch attitude and a function dependent upon said acceleration such that said indication is indicative of at least the sense of said difference.

In one specfic form of aircraft instrument described in the above-mentioned co-pending patent application, the function dependent upon the forward acceleration is simply the product of said acceleration and a constant, the instrument as a result providing an indication of pitch rate in accordance with the equation:

$$d\theta/dt = KdV/dt \qquad (1)$$

where
$\theta$ is the pitch attitude of the aircraft,
V is the forward velocity of the aircraft,
K is a constant, and
$t$ is time, $d\theta/dt$ and $dV/dt$ being respectively the rate of change of pitch attitude and the forward acceleration of the aircraft.

It has been found that if equation (1) is used as a director law during take-off, that is to say if the rate of change of pitch of the aircraft is maintained in constant proportion to the acceleration along the flight path during take-off, a flight path which satisfies broadly safety and operational requirements is achieved. The equation has, in particular, been assessed by calculation covering variations in factors such as the total, all-up weight of the aircraft at take-off and the available propulsive thrust. In respect of calculations relating to one particular multi-engine transport aircraft, for example, consideration has been given to each of the combinations of circumstances that arise when the total weight is 100,000 lbs. or 160,000 lbs. and when all engines or all engines except one are operative. With each case, the equation gives a satisfactory flight path with a satisfactory forward speed, a satisfactory margin to stall, and a satisfactory acceleration increment normal to the flight path, when a value of 0.003 or 0.004 is used for the constant K, the rate $d\theta/dt$ in these circumstances expressed in radians per second and the acceleration $dV/dt$ in feet per second per second. Better speeds and speed margins are obtained, at the expense of lower flight paths, with the value 0.003 rather than 0.004 for the constant K. A lower value than 0.003 for the constant K gives an unduly low flight path under the conditions in which one engine is inoperative, and the total weight is 160,000 lbs., while under these conditions a higher value than 0.004 does not allow enough speed margin. The acceptable range for the constant K in the case of this one particular aircraft is thus established, and can equally well be established for other aircraft.

It is an object of the present invention to provide an aircraft instrument which is a development of the basic form referred to above, and which is applicable where it is desired to achieve a specific result during maneuver of the aircraft.

According to one aspect of the present invention an aircraft instrument comprises first means for providing a first signal dependent upon forward acceleration of the aircraft, second means which is arranged to be responsive to said first signal to provide a second signal dependent upon the value of the algebraic sum of at least two terms, a first of said two terms having a value which is dependent upon the magnitude of said acceleration, and the second of said two terms having a value which is dependent upon a predetermined value of a predetermined variable, third means for providing a third signal dependent upon rate of change of pitch attitude of the aircraft, and fourth means which is arranged to be responsive to said second and third signals to provide an indication which is indicative of at least the sense of difference between said sum and said rate of change of pitch attitude.

The use of said second term in addition to the first term dependent upon forward acceleration, gives rise to a director law which is essentially more complicated than that expressed by equation (1), but this allows a desired result, such as for example meeting the requirements of a particular aircraft during take-off, to be achieved while at the same time maintaining an adequate safety factor. In this latter respect, for example, a current large turbojet aircraft requires a nose-up attitude change of some ten degrees during take-off in order to become airborne, that is to say for "lift-off," and this change in pitch attitude must all take place during the last few seconds of the ground run and cannot be started at too low a forward velocity since a low-drag attitude is required for minimum ground-run distance. As a result of this requirement it has been found that the so-called "rotation" phase of the ground run, that is to say the phase during which the pitch attitude of the aircraft is brought to that required for lift-off, requires a rate of change of pitch of, for example, 2.5 to 3.0 degrees per second. Now, if the aircraft is heavily loaded and an engine fails before lift-off, the forward acceleration of the aircraft at the end of the ground run will be very low so that if the simple director law of equation (1) is used, the rate of change of pitch attitude demanded, for example, 0.5 degree per second, will possibly be insufficient to achieve safely the required rotation maneuver for lift-off.

The difficulty can be overcome however as a result of an appreciation that the director law of equation (1) is that which is applicable to safe maneuvers of the aircraft during flight, and that in fact much higher pitch rates than provided by this law are safe immediately prior to lift-off during the rotation phase. In these circumstances use may be made of an aircraft instrument which according to a feature of the present invention comprises first means for providing a signal dependent upon forward acceleration of the aircraft, second means for providing a signal dependent upon rate of change of pitch attitude of the aircraft, third means for providing a signal dependent upon the pitch attitude of the aircraft, and fourth means which is arranged to be responsive to the three signals provided by the first, second and third means to provide a demand for rate of change of pitch attitude which demand is dependent upon difference between said rate of change of pitch attitude and a function dependent upon said acceleration, said fourth means including means responsive to the signal provided by said third means to include in said function until the pitch attitude of the aircraft reaches a predetermined value a term dependent upon the extent to which the pitch attitude of the aircraft differs from said predetermined value.

The said predetermined pitch attitude is preferably the pitch attitude which is to be attained at lift-off, it being arranged that during the ground run of the aircraft the difference between said predetermined pitch attitude and the pitch attitude of the aircraft produces a component of pitch rate demand, which component is of a sense to demand increase in pitch rate when the aircraft pitch attitude is less than said predetermined pitch attitude, and which is larger the larger the difference between them. In this latter case therefore, the difference between the aircraft pitch attitude and the pitch attitude required for lift-off is used to create an additional pitch rate demand component during the ground run where high pitch rates are safe. The instrument in the present case preferably includes means by which the value of said predetermined pitch attitude may be carried selectively.

The director law of equation (1) when used for the take-off maneuver leads to a final steady forward velocity for "climb-out," that is to say for the phase of take-off which follows the flare-up (normally a substantially exponential flare-up) from the ground, and for which the inclination to the ground of the flight path is substantially constant. However, this final velocity may not necessarily be the velocity that would be recommended for a particular climb-out, and furthermore if the pilot did not meet the director demands indicated by the instrument throughout the flare-up, a different climb-out velocity would in any case result. The difficulty in this case may be overcome by using an aircraft instrument which according to a further feature of the present invention comprises first means for providing a signal dependent upon forward acceleration of the aircraft, second means for providing a signal dependent upon rate of change of pitch attitude of the aircraft, third means for providing a signal dependent upon the forward velocity of the aircraft, and fourth means which is arranged to be responsive to the three signals provided by the first, second and third means to provide a demand for rate of change of pitch attitude which demand is dependent upon difference between said rate of change of pitch attitude and a function dependent upon said acceleration, said fourth means including means responsive to the signal provided by said third means to include in said function a term dependent upon the extent to which the forward velocity of the aircraft differs from a predetermined value of forward velocity.

The said predetermined velocity is preferably the velocity that is to be attained for climb-out, it being arranged that the difference between said aircraft velocity and said predetermined velocity results in a component of pitch rate demand, which component is of a sense to demand increase in pitch rate when the forward velocity exceeds said predetermined velocity, and which is larger the larger the difference between them. In this case therefore there is provided an additional pitch rate demand component directing the pilot of the aircraft to a predetermined best velocity for climb-out. The instrument preferably includes in this case means by which the value of said predetermined velocity may be varied selectively.

A final steady forward velocity for climb-out is normally required in the case of current transport aircraft using conventional take-off techniques, however it may not be required in the case, for example, where a short take-off (STO) technique is to be used and changes in configuration of the aircraft are to take place during climb-out. In the latter case it has been proposed that the aircraft shall have a substantially constant acceleration along its flight path at least during an initial part (for example, to a height of six hundred feet) of the climb-out phase. The pilot in such circumstances may be assisted to achieve the required acceleration together with an acceptable flight path, by use of an instrument which in accordance with a feature of the present invention, comprises means for providing a signal dependent upon forward acceleration of the aircraft, means for providing a signal dependent upon rate of change of pitch attitude of the aircraft, and means responsive to both signals to provide an indication dependent upon difference between said rate of change of pitch attitude and a function which is dependent upon the extent to which said acceleration differs from a predetermined value, such that as the forward acceleration of the aircraft tends to said predetermined value the difference between rate of change of pitch attitude and said function reduces towards zero.

The said predetermined value of acceleration may be the value that is to be attained for climb-out, and said function may simply be the product of a constant and the difference between the actual and predetermined values of acceleration, the instrument providing an indication which is indicative of the sense, and preferably also, of the magnitude, of the difference between the rate of change of pitch and said function so as to demand change in pitch rate to bring the acceleration along the flight path to said predetermined value. It may be arranged that this predetermined value is variable selectively by an appropriate manual, or alternatively, automatic operation, and in this respect said predetermined value may be computed as a function of the performance capabilities of the aircraft at each particular take-off.

In any of the cases specified above, the means for providing the indication which is indicative of at least the sense of said difference may include an indicator of the general kind described in U.S. Patent No. 3,191,147 of A. M. A. Majendie, issued June 22, 1965. The indicator in this case may be specifically as described in U.S. Patent No. 3,085,429 of A. M. A. Majendie, issued April 16, 1963 and include a cylindrical member which is mounted for rotation about its longitudinal axis and which carries an optically distinct helical band coaxial therewith, the member being rotated by a servo system at a rate and in a sense dependent upon the magnitude and sense respectively of said difference, so that the helical band provides an optical effect of movement at a rate and in a sense dependent upon said difference. Alternatively, the means for providing the indication may include a center-zero meter of conventional form or an indicator as described in U.S. Patent No. 3,283,573 of Bishop et al., issued November 8, 1966.

According to another aspect of the present invention an aircraft instrument comprises first means for providing a first signal dependent upon forward acceleration of the aircraft, second means which is arranged to be responsive to said first signal to provide a second signal dependent upon the value of the algebraic sum of at least two terms, a first of said two terms having a value which is dependent upon the magnitude of said acceleration, and the second of said two terms having a value which is dependent upon a predetermined value of a predetermined variable, third means for providing a third signal dependent upon rate of change of pitch attitude of the aircraft, and fourth means which is arranged to be responsive to said second and third signals to provide a signal dependent upon any difference between said sum and said rate of change of pitch attitude.

The signal dependent upon said difference may be a signal which is used to provide an indication of said difference in the manner of the instruments described above, however, it may alternatively be used in more complex arrangements. For example, in the event that fully- or semi-automatic take-off facilities are provided the signal may be used more directly in the control of the aircraft.

Two aircraft instruments in accordance with the present invention will now be described, by way of example, with reference to the accompanying drawings, in which:

FIGURE 4 shows the manner in which FIGURES 1, 2 and 3 are to be positioned with respect to one another to show the first instrument.

Figure 1:
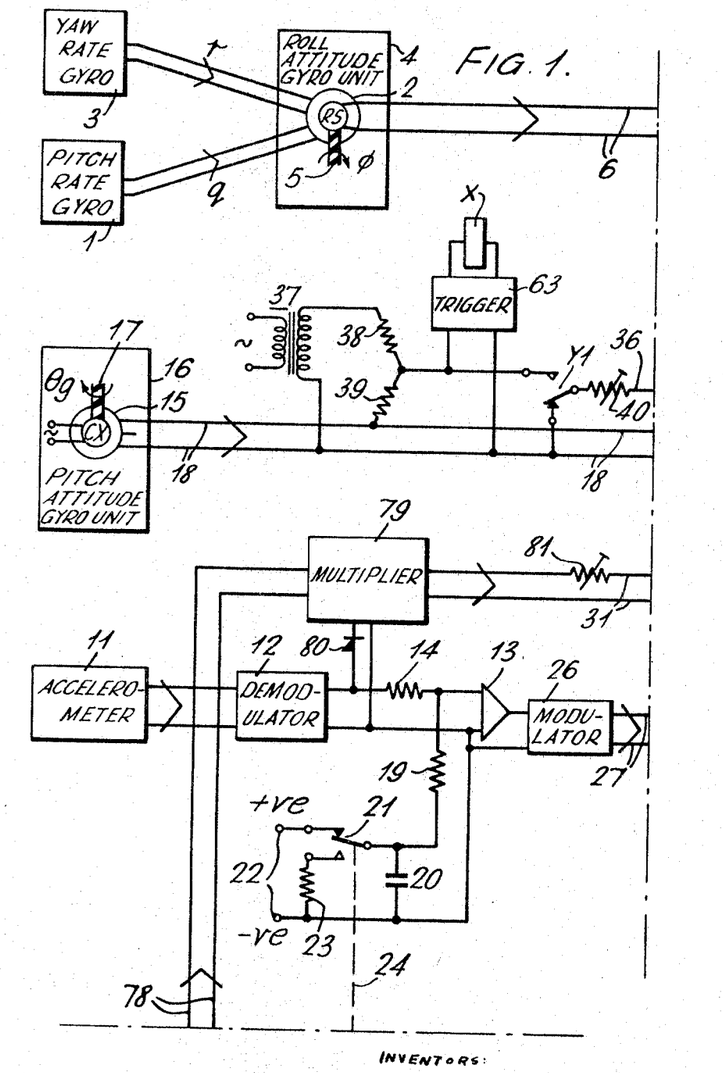
FIGURES 1, 2 and 3 together show the circuit arrangement of the first instrument.
Figure 2:
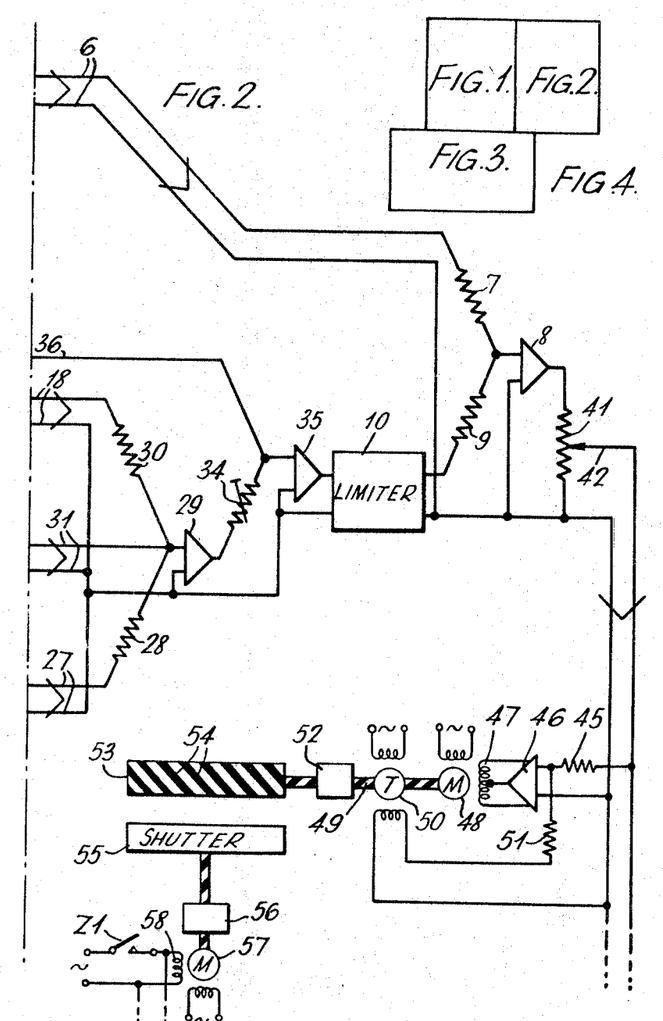
Figure 3:
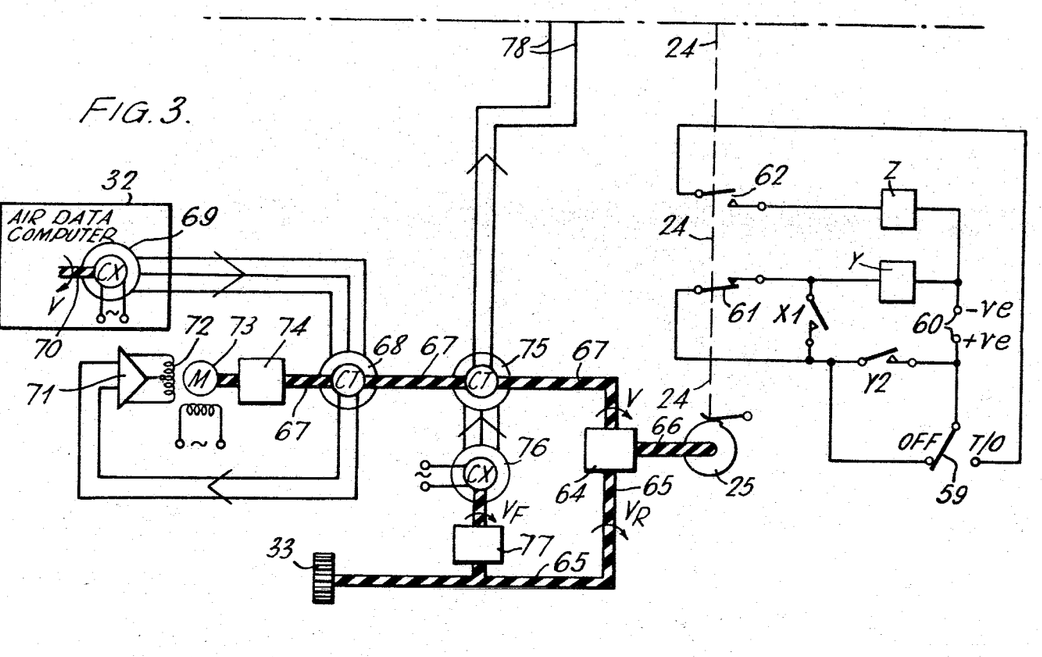

Referring to FIGURES 1, 2 and 3, a pitch rate gyro 1 derives an electric alternating current signal representative of the angular velocity $q$ of the aircraft about its pitch axis, and this signal is supplied to one of two stator windings of a synchro resolver 2. An electric alternating current signal which is representative of the angular velocity $r$ of the aircraft about its yaw axis, and which is derived by a yaw rate gyro 3, is supplied to the other stator winding of the resolver 2. The resolver 2 forms part of a roll-attitude gyro unit 4, and has its rotor coupled to a shaft 5 which is rotated in accordance with the angle $\phi$ of the aircraft about its roll axis, as this is measured by a roll attitude gyro (not shown) in the unit 4. The signal which is as a result induced in the rotor winding of the resolver 2 is representative of $(q \cos \phi - r \sin \phi)$ and this is taken as providing a measure of the rate of change of pitch, $d\phi/dt$, of the aircraft measured with respect to gravity axes.

A signal representative $d\theta/dt$ is applied via a pair of leads 6 and a resistor 7 to the input of an amplifier 8 which also receives, via a resistor 9, another alternating current signal dependent, among other things, upon the forward acceleration $dV/dt$ of the aircraft. This latter signal, which is supplied to the amplifier 8 by a limiter 10, is derived basically from an accelerometer 11. The accelerometer 11, which may be in the form of a pendulum mounted for angular displacement about an axis parallel to the pitch axis of the aircraft, derives an electric alternating current signal representative of $(dV/dt + g \sin \theta)$, where $g \sin \theta$ is an unwanted gravitational component which is inherently measured by the accelerometer 11. The alternating current signal from the accelerometer 11 is supplied to a demodulator 12 so as to derive a corresponding direct current signal, and this latter signal is applied to a direct current amplifier 13 via a resistor 14.

In order to be able to derive from the signal supplied by the accelerometer 11 to the amplifier 13 a signal representative of the acceleration component $dV/dt$ and substantially independent of the gravitational component $g \sin \theta$, use is made of a signal supplied by a synchro control transmitter 15 of a pitch-attitude gyro unit 16. The rotor winding of the synchro control transmitter 15 is excited by alternating current of constant amplitude, and is rotated with respect to the three-phase stator windings of the transmitter 15 is accordance with an angle $\theta_g$ which is the measure of the pitch attitude of the aircraft as this is provided by a pitch attitude gyro (not shown) in the unit 16. The angle $\theta_g$ exceeds the pitch angle $\theta$ by an error angle $\theta_e$ which arises because of the acceleration $dV/dt$ of the aircraft and the resultant short-term erection errors in the pitch attitude gyro. The error angle $\theta_e$ is normally of small value, and reaches its maximum value of, for example, three degrees, at or just after lift-off. After lift-off it decreases slowly to zero.

A signal which appears across two phases of the stator windings of the synchro control transmitter 15 is representative of $-\sin \theta_g$). It is this signal as supplied to a pair of leads 18, which is used in removing the unwanted gravity component $g \sin \theta$ from the signal supplied by the accelerometer 11, and in this respect this signal is taken as being, to a satisfactory degree of approximation, representative of $-(\sin \theta + \theta_e)$. Compensation for the component $\theta_e$ introduced by this signal is made using a direct current signal which is synthesized to be representative of the error angle $\theta_e$, and which is supplied to the amplifier 13 via a resistor 19, to be there added as a component $g\theta_e$ to the signal derived from the accelerometer 11.

The signal supplied via the resistor 19 to the amplifier 13 is synthesized by means of a circuit including a capacitor 20 which is arranged to be charged and discharged via a set of changeover contacts 21. In a first position (as shown) of the contacts 21 the capacitor 20 is connected directly across terminals 22 of a direct current supply, whereas in the second position the capacitor 20 is discharged through a resistor 23. The contacts 21 are controlled, as represented by a mechanical connection 24, by a cam 25 which, as described later, maintains the contacts 21 in said first position until the aircraft attains a forward velocity approaching that set for the rotation phase of take-off, and then switches them over to the said second position. In this manner, the signal appearing across the capacitor 20 and applied via the resistor 19 to the amplifier 13, has a magnitude which is constant until the rotation phase of take-off is reached and then decays to zero.

The direct current output signal of the amplifier 13, being representative of $(dV/dt + g \sin \theta + g\theta_e)$, is supplied to a modulator 26 so as to derive a corresponding alternating current signal. This alternating current signal is supplied via a pair of leads 27 and a resistor 28 to an amplifier 29. The amplifier 29 also receives a signal representative of $-g(\sin \theta + \theta_e)$, this signal being derived via a resistor 30 from the signal supplied via the leads 18 by the synchro control transmitter 15. Thus the combined effect of the two signals supplied respectively via the resistors 28 and 30 is to provide an input component to the amplifier 29 representative of the forward acceleration $dV/dt$.

In the present instance the amplifier 29 is supplied with an input component additional to the component representative of forward acceleration $dV/dt$. This additional component signal, which is supplied to the amplifier 29 via a pair of leads 31, the representative of:

$$\gamma(V - V_\mathrm{F})/T_\mathrm{V}$$

$V_\mathrm{F}$ is the predetermined final value of the forward velocity $V$ required for climb-out, $T_\mathrm{V}$ is a constant, and $\gamma$ is defined as $(T - D_\mathrm{r})/W$, T being the total propulsive thrust of the aircraft, $D_\mathrm{r}$ the aircraft drag, and W the laden weight of the aircraft.

The manner in which this signal is generated will be described in detail later, and it will suffice to say at the moment that it is derived in accordance with a representation of the velocity V provided by an air data computer 32 (or other airspeed sensor), and with the setting of a control knob 33 by which the pilot of the aircraft selects the value, $V_\mathrm{R}$, of forward velocity at which the rotation phase is to commence, and also in accordance with the signal representative of $$(V/dt + g \sin \theta)$$

provided by the demodulator 12.

The output signal of the amplifier 29 is supplied via a pre-set resistor 34 to be combined at the input of an amplifier 35 with a signal which, in dependence upon the position of changeover contacts Y1 of a relay Y, appears on a lead 36 and is representative of:

$$(\theta_\mathrm{L} - \theta_g)/T_\theta$$

where $\theta_L$ is a predetermined value of pitch angle $\theta$ required for lift-off, and $T_\theta$ is a constant.

The signal on the lead 36 is derived from a signal representative of $(\theta_L-\theta_g)$, which is itself derived as the sum of a signal supplied by the secondary winding of a transformer 37 and the signal applied to the leads 18 from the synchro control transmitter 15. The transformer 37 has a primary winding which is excited by alternating current of constant amplitude, and has a turns ratio such that the signal supplied from its secondary winding via a resistor 38 is representative of the appropriate value for $\theta_L$. To this signal is added, via a resistor 39, the signal representative of $(-\sin \theta_g)$ which is supplied from the synchro control transmitter 15, and which in the present context is taken as a sufficiently good approximation to $(-\theta_g)$. The combined signal is supplied to the change-over contacts Y1 which are in a position to pass the combined signal, via a pre-set resistor 40, to the lead 36 only while the relay Y is energized. (The contacts Y1 are shown in FIGURE 1 in the position which is adopted while the relay Y is not energized, and for which no signal appears on the lead 36.) As explained later, the relay Y is normally energized during a take-off maneuver only until lift-off, with the result, therefore, that the combined input signal which is supplied to the amplifier 35 is representative before lift-off:

$$K\{dV/dt+\gamma(V-V_F)/T_V\}+\{\theta_L-\theta_g\}/T_\theta \quad (2)$$

whereas after lift-off it is representative of:

$$K\{dV/dt+\gamma(V-V_F)/T_V\} \quad (3)$$

The values of the constants K and $T_\theta$ are dependent upon the settings of the resistors 34 and 40 respectively.

The output signal of the amplifier 35 is supplied to the limiter 10 for application via the resistor 9 to the amplifier 8. This signal is supplied to the amplifier 8 as a computed demand for pitch rate $d\theta/dt$ of the aircraft, and is limited by the limiter 10 such that the demand cannot exceed a maximum safe value of, for example, three degrees per second. The amplifier 8 in response to this demand signal and the signal representative of actual pitch rate $d\theta/dt$ supplied via the resistor 7, supplies an output signal representative in magnitude and sense of any difference between the actual and demanded pitch rates. This output signal is supplied across a potentiometer 41, and the fractional proportion of this signal which is derived at the pre-set tap 42 of the potentiometer 41 is supplied to two identical indicator arrangements (only one of which is shown).

In each indicator arrangement the signal derived at the tap 42 is applied via a resistor 45 to a servo amplifier 46 which controls the energization of the control phase 47 of a servo motor 48. The motor 48 drives a shaft 49 to which a tachometer generator 50 is coupled. The tachometer generator 50 supplies to the amplifier 46, via a resistor 51 and as degenerative feedback, a signal dependent upon the rate of rotation of the shaft 49. The shaft 49 is thereby rotated by the motor 48 at a rate and in a sense dependent upon the magnitude and sense, respectively, of the difference represented by the output signal of the amplifier 8.

The shaft 49 in each indicator arrangement drives via gearing 52 a respective cylinder 53 which is mounted for rotation about its longitudinal axis and which carries an optically distinct helical band 54 on its outer surface (making the cylinder 53 comparable in appearance with a "barber's pole"). The cylinders 53 of the two arrangements are mounted one on either side of the pilot of the aircraft to lie in the periphery of his field of view and generally parallel to his line of sight when he is looking forward of the aircraft through the windscreen. Rotation of the cylinders 53 (as in the case of the corresponding cylinders described in U.S. Patent No. 3,085,429) provides to the pilot an optical effect of movement by parafoveal stimulation, and in this manner conveys directions to him for controlling the aircraft in pitch. The two cylinders 53 rotate in the same sense as one another, one sense of rotation giving direction for increase in pitch attitude and the opposite sense direction for decrease. The rate of rotation in either sense conveys the magnitude of the directed change, and in this manner the two indicator arrangements act to convey to the pilot information regarding the magnitude and sense of the pitch change which is required to reduce the output signal of the amplifier 8 to zero. Thus, the pilot is directed to maneuver the aircraft in pitch to maintain the actual pitch rate $d\theta/dt$ equal to the demanded pitch rate, the demanded pitch rate being given by expression (2) or (3), as the case may be, and being limited in accordance with the action of the limiter 10.

Each cylinder 53 is normally obscured from view by an individual spring-loaded shutter 55. The shutter 55 is driven back against its spring-loading to expose the cylinder 53 to view, only from shortly before the beginning of the rotation phase of a take-off maneuver. The required drive is provided via gearing 56 by a servo motor 57, the motor 57 having a control phase 58 which is energized only when a relay contact Z1 of a relay Z is closed. (In FIGURE 2, the relay contact Z1 is shown open.) The relay contact Z1 is closed, so that the cylinders 53 are exposed, only when the relay Z is energized, energization of the relay Z being controlled in dependence upon the setting of the control knob 33 and a manually-operable switch 59 available to the pilot.

The switch 59 has two settings, one OFF, and the other T/O (signifying "take-off"). When the switch 59 is set to the OFF position (as shown) it is effective to enable energization of the relay Y, whereas when it is set to the T/O position it is effective to enable energization of the relay Z. Energization current in both cases is derived from terminals 60 of a direct current supply, and the energization circuits of the relays Y and Z include respectively two sets of contacts 61 and 62. Both sets of contacts 61 and 62 are controlled, as represented by the mechanical connection 24, by the cam 25 such that the contacts 61 remain closed, and the contacts 62 open, until the aircraft attains a forward velocity approaching the value $V_R$ set by the knob 33 for the commencement of the rotation phase.

Before commencement of a take-off maneuver, the switch 59 is set to OFF, and so there is then a path through contacts 61 (at this time closed) to energize relay Y. Energization of relay Y, in addition to switching over contacts Y1 (and thereby making the combined signal derived from the junction of the resistors 38 and 39 effective in the amplifier 35), closes a normally-open set of contacts Y2 which is effective to maintain energization of the relay Y irrespective of change in setting of the switch 59. A set of contacts X1 of a relay X is also in the closed condition at this time and provides a path in shunt with the contacts 61. Thus, as long as the relay X is energized, the relay Y is held energized through contacts X1 and Y2 irrespective of change in setting of the switch 59, and opening of the contacts 61 at the commencement of the rotation phase.

Energization of the relay X is controlled by a trigger circuit 63 which is responsive to the signal appearing at the junction of the resistors 38 and 39 to discriminate between the two conditions in which the value of angle $\theta_g$ is less than, and at least equal to, the value of angle $\theta_L$. While the first of these conditions applies, that is to say before the lift-off angle $\theta_L$ has been attained, the trigger circuit 63 maintains the relay X energized whereas when the second condition applies relay X is de-energized. Thus throughout the rotation phase until the desired lift-off angle $\theta_L$ has been attained, the contacts X1 remain closed, this holding the relay Y energized and thereby maintaining the signal on the lead 36 effective in the amplifier 35. Because of the holding contacts Y2, this applies irrespective of the fact that in normal practice the switch 59 is in its T/O setting during take-off.

The pilot sets the switch 59 to T/O before commencing the ground run, and the relay Z remains de-energized until the contacts 62 close under control of the cam 25. When the contacts 62 close, the relay Z becomes energized, thereby effecting opening of the shutters 55 for the commencement of the rotation phase.

The cam 25 which controls the sets of contacts 21, 61, and 62 is rotated in accordance with difference between the actual forward velocity V of the aircraft and the value $V_R$ selected by the setting of the knob 33 for the commencement of the rotation phase. The setting of the knob 33 is conveyed to one input of a differential gear 64 via a shaft 65, and the cam 25 is coupled to be driven by the output of the differential gear 64 via a shaft 66. A shaft 67 that is rotated to a position representative of the aircraft velocity V as this is measured by the air data computer 32, is coupled to a second input of the differential gear 64 so that the rotational position of the shaft 66, in accordance with the difference in angular positions of the shafts 65 and 67, is representative of the difference $(V-V_R)$. The cam 25 is mounted on the shaft 66 and has a profile such that it effects changeover of the contacts 21, 61, and 62 from their normal positions when this difference has been reduced to a small constant value $V_E$. The small constant value $V_E$ involved has the effect of causing the cam 25 to actuate the contacts 21, 61 and 62 slightly in advance of the attainment of the velocity value $V_R$ set for commencement of the rotation phase. This makes allowance for the reaction time of the pilot when the shutters 55 are opened in response to closure of the contacts 62, and ensures that he is responsive to the directions given by the rotating cylinders 53 from the commencement of the rotation phase. The profile of the cam 25 (not represented accurately in FIGURE 3) is such that the contacts 21, 61, and 62 remain in their changed-over positions for as long as the velocity V as represented by the position of the shaft 67, is equal to, or greater than, $(V_R-V_E)$.

The shaft 67 is positioned in accordance with the velocity V measured by the air data computer 32, under control of a servo system which includes a synchro control transformer 68 that has its rotor coupled to the shaft 67. The three-phase stator winding of the synchro control transformer 68 is excited by a signal which is representative of the velocity V and which is supplied from the stator of a synchro control transmitter 69 in the computer 32. The rotor of the transmitter 69 is excited by alternating current of constant amplitude, and is angularly positioned by a shaft 70 according to the measure of velocity V which is provided in the normal way by the computer 32.

As a result of the signal from the synchro control transmitter 69, there is induced in the rotor of the synchro control transformer 68 a signal representing the error in the angular position of the shaft 67. The error signal is supplied to a servo amplifier 71 that controls excitation of the control phase 72 of a servo motor 73. The motor 73 is coupled through gearing 74 to the shaft 67, and in accordance with the excitation of the control phase 72, tends to reduce the error signal to zero and thereby maintain the angular position of the shaft 67 truly representative of the velocity V.

The rotor of a synchro control transformer 75 is coupled to rotate with the shaft 67 and to be excited by a three-phase signal supplied from the stator of a synchro control transmitter 76. The rotor of the transmitter 76 is excited by alternating current of constant amplitude and is angularly positioned in accordance with the setting of the knob 33, the rotor being coupled through gearing 77 to the shaft 65. The gearing 77 provides a non-linear drive between the shaft 65 and the rotor of the transmitter 76 so that the rotor position corresponds to the climb-out velocity $V_F$, the climb-out velocity $V_F$ appropriate to the aircraft in the present circumstances being related by a non-linear function to the velocity $V_R$ which is selected for commencement of the rotation phase. (It will be appreciated that instead of providing the non-linear gearing 77, provision may be made for the rotor position to be set as desired by the pilot.)

The signal applied to the synchro control transformer 75 from the synchro control transmitter 76 is representative of the appropriate climb-out velocity $V_F$, and as a result of this there is derived at the rotor of the transformer 75 a signal representative of the difference $(V-V_F)$. This latter signal is supplied via leads 78 to a multiplier circuit 79 for use in deriving the signal which, as mentioned earlier, is supplied to the amplifier 29 via the leads 31. The multiplier circuit 79 also receives, via a diode 80, the signal supplied by the demodulator 12; this signal is taken in the present instance as providing a measure of the value of the factor $\gamma$, and the diode 80 serves to limit this factor to positive values. The output signal of the multiplier circuit 79 is supplied via a preset resistor 81 to the leads 31. The signal on the leads 31 is representative:

$$\gamma(V-V_F)/T_V$$

the value of the constant $T_V$ being dependent upon the setting of the resistor 81.

When, in operation of the instrument, the aircraft has attained the forward velocity value $V_R$ for the commencement of the rotation phase, and the shutters 55 have consequently opened, the pilot is directed by the movements of the cylinders 53 to maintain a rate of pitch $d\theta/dt$ as given by the pitch rate demand expressed by function (2). This function includes the component dependent upon $(\theta_L - \theta_g)$, which, throughout the rotation phase, is supplementary to the other components of the pitch rate demand until the angle $\theta_L$ for lift-off is attained. A high pitch rate is acceptable, and as mentioned earlier is often necessary, during the rotation phase.

When the lift-off angle $\theta_L$ has been attained, the relay X, and in consequence the relay Y, is de-energized. As a result the contacts Y1 open and the control function then becomes function (3) instead of function (2), the term dependent upon $(\theta_L - \theta_g)$ being omitted. This term cannot be reintroduced until the switch 59 is again set to OFF at the end of the take-off maneuver.

After lift-off the directions given to the pilot for maintaining the pitch rate $d\theta/dt$ in accordance with the pitch rate demand expressed by function (3), are such that if followed by him result in an acceptable flight path and a climb-out velocity $V_F$. Thus, the present instrument as well as directing the pilot to achieve quickly the predetermined pitch angle $\theta_L$ for lift-off, also directs him to attain the predetermined forward velocity $V_F$ for climb-out. (It will be appreciated that either of these facilities need not be used, simply by arranging that the relevant component signal is omitted from the pitch rate demand.)

With the above instrument the measure of pitch rate $d\theta/dt$, computed as $(q \cos \theta - r \sin \theta)$ is related to gravity axes irrespective of roll of the aircraft, but it will be understood that where a wings-level attitude is maintained throughout take-off, the measure of pitch rate $d\theta/dt$ may be obtained directly from the signal which is supplied by pitch rate gyro 1 and which is representative of angular velocity $q$. Where however the wings-level attitude is not maintained, there are a variety of alternatives to the method described above for deriving the measure of pitch rate $d\theta/dt$ appropriately related to gravity axes. For example, a measure of the pitch rate $d\theta/dt$ may be derived as the differential of the pitch angle $\theta$ measured, for example, by the pitch attitude gyro unit 17. In this latter case however, it may be found that the noise-level of the signal which provides the measure of angle $\theta$ is too high for satisfactory derivation of the measure of pitch rate $d\theta/dt$, and it may be preferable to combine differentiation of pitch attitude $\theta$ and pitch rate $q$ signals using complementary filtering techniques, the measure of pitch rate $d\theta/dt$ used in these circumstances being computed as:

$$\{D/(1+\tau D)\}\{\theta+\tau q\}$$

where $\tau$ is a time constant and D is the differential operator representative of differentiation with respect to time.

Figure 5:
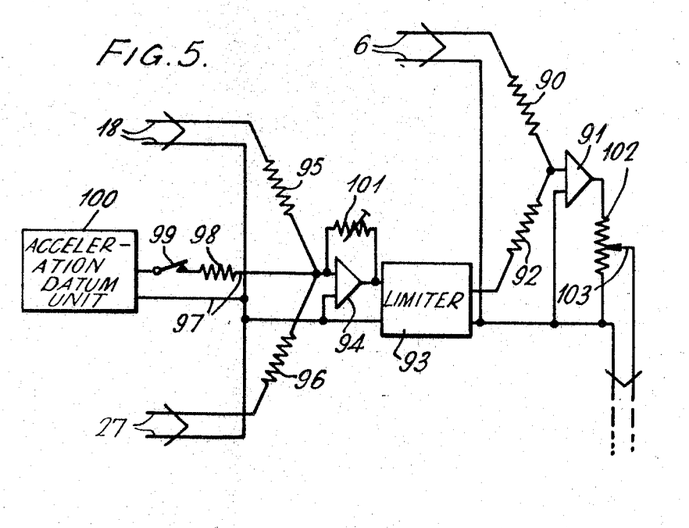
FIGURE 5 shows the circuit arrangement of part of the second instrument.

In certain applications, where for example an STO technique is being used, it may be found desirable, as mentioned above, that the aircraft shall have a substantially constant forward acceleration, rather than constant forward velocity, during at least an initial part of the climb-out phase. A form of instrument that may be used to assist the pilot in achieving this will now be described with reference to FIGURE 5. Only those parts of the instrument that differ substantially from corresponding parts of the instrument of FIGURES 1, 2 and 3 are shown in FIGURE 5. In this latter respect, the present instrument includes: means corresponding to the pitch rate gyro 1, the yaw rate gyro 3 and the roll-attitude gyro unit 4 for providing on leads 6 a signal representative of the actual pitch rate $d\theta/dt$; means corresponding to the pitch attitude gyro unit 16 for providing on leads 18 a signal representative of $-(\sin \theta+\theta_e)$; and means corresponding to the accelerometer 11 and its associated circuits including the capacitor 20 and resistor 23 for providing on leads 27 a signal representative of $(dV/dt+g \sin \theta+g \theta_e)$.

Referring to FIGURE 5, the signal representative of the pitch rate $d\theta/dt$ is supplied from the leads 6 and via a resistor 90 to the input of an amplifier 91. The amplifier 91 receives via a resistor 92 a signal which is supplied from a limiter 93 and which is representative of the function:

$$K\{dV/dt-(dV/dt)_d\} \qquad (5)$$

where $(dV/dt)_d$ is the predetermined value of forward acceleration required for climb-out. This signal is supplied to the limiter 93 from an amplifier 94 that receives via resistors 95 and 96 respectively the signals on the leads 18 and 27, and also receives, from a pair of leads 97, a signal representative of the datum acceleration $(dV/dt)_d$. This latter signal is supplied to the leads 97, via a resistor 98 and a switch 99, from an acceleration-datum unit 100 which is simply a unit for providing an alternating current signal of substantially constant amplitude. The amplitude level of this signal, and thereby the value of the datum acceleration $(dV/dt)_d$, is selectively variable by operation of a suitable control (not shown) of the unit 100, this control being set by the pilot prior to take-off. In this connection, the unit 100 may include a synchro control transmitter (not shown) that has its rotor excited by alternating current of constant amplitude, the angular position of the rotor with respect to the stator being set under the control of a knob available to the pilot. With this arrangement the signal which appears across two phases of the three-phase stator, and which thereby has an amplitude level dependent upon the setting of the control knob, may be taken as the output signal of the unit 100 to be applied via the switch 99 and the resistor 98 to the leads 97. (The control of the amplitude level of the output signal from the unit 100 may be automatic rather than manual and may in fact be varied during the course of the take-off maneuver to take account of varying circumstances.)

Assuming that the switch 99 is in the closed position as shown, the amplifier 94 derives in response to the three signals it receives, a signal representative of function (5), the value of the constant K being dependent upon the setting of a pre-set resistor 101 that is connected between the input and output of the amplifier 94. This signal, which is representative of the pitch rate demand in this case, is limited by the limiter 93 to a level corresponding to a pitch rate of some three degrees per second.

The signal which is derived by the amplifier 91 in response to the signals it receives from the leads 6 and the limiter 93 is representative of the difference between the actual pitch rate $d\theta/dt$ and the demanded pitch rate. This signal is applied across a potentiometer 102 and the signal derived from a pre-set tap 103 of the potentiometer 102 is supplied to indicator arrangements (not shown) which are both substantially the same as that shown in FIGURE 2. In this manner the pilot is provided with directions which if followed result in a satisfactory flight path while at the same time ensuring that during climb-out, when the pitch rate $d\theta/dt$ is zero, the forward acceleration $dV/dt$ of the aircraft has the required datum value $(dV/dt)_d$.

Although the datum-acceleration component $(dV/dt)_d$ of the pitch rate demand is described in the present instrument as being derived from a special unit 100, this component may instead be derived by a tilt-adjustment of the datum axis of the accelerometer means (corresponding to the accelerometer 11 of FIGURE 1) relative to the attitude datum axis of the aircraft, or by manipulation of the zero datum of the accelerometer output signal. In the present case the director law including the component $(dV/dt)_d$ is required to be used only for STO maneuvers, and it is required that the instrument can be switched simply to operate according to the basic director law of Equation 1, when a conventional take-off maneuver is to be performed. The change to the basic law is achieved in the present case simply by opening the switch 99, the instrument then acting in substantially the same manner as the instrument described above with reference to the drawing accompanying the above-mentioned co-pending U.S. patent application Serial No. 326,654. (If so desired the switch 99 may be dispensed with, it being arranged in these circumstances, for example, that the control which determines the value of the datum-acceleration component is set to zero when the basic law is required to apply.)

It will be appreciated that if desired the instrument described above with reference to FIGURE 5 may be modified so that it operates in the same manner as the instrument described with reference to FIGURES 1, 2 and 3 when the switch 99 is open.

We claim:
1. An aircraft instrument comprising,
   first means for providing a first signal dependent upon forward acceleration of the aircraft,
   second means for providing a second signal representing a predetermined value of a predetermined variable,
   third means for deriving a third signal in accordance with any difference between a measured value of said predetermined variable and said predetermined value,
   fourth means for providing a fourth signal dependent upon said first and third signals,
   fifth means for providing a fifth signal dependent upon the rate of change of pitch attitude of the aircraft,
   comparison means for comparing said fourth and fifth signals,
   utilization means,
   and means coupling said comparison means to said utilization means for controlling said utilization means in accordance with any difference between said fourth and fifth signals.

2. An aircraft instrument according to claim 1 wherein said fourth means includes a limiter for limiting to a predetermined upper limit the value of said fourth signal.

3. An aircraft instrument according to claim 1 wherein said first means includes an accelerometer.

4. An aircraft instrument according to claim 1 wherein said fifth means is a pitch rate gyro.

5. An aircraft instrument comprising first means for providing a first signal dependent upon forward acceleration of the aircraft, second means for providing a second signal dependent upon difference between a measured value and a predetermined value of a predetermined variable, third means responsive to said first and second signals to provide a third signal dependent upon the value of the algebraic sum of at least two terms, a first of said two terms having a value which is dependent upon the magnitude of said acceleration, and the second of said two terms having a value which is dependent upon said difference between the measured and predetermined values of said predetermined variable, fourth means for providing a fourth signal dependent upon rate of change of pitch attitude of the aircraft, and fifth means responsive to said third and fourth signals to provide an indication which is indicative of at least the sense of difference between said sum and said rate of change of pitch attitude.

6. An aircraft instrument according to claim 5 wherein said predetermined variable is angle of pitch of the aircraft.

7. An aircraft instrument according to claim 6 including switch means which is switchable from a first state to a second state to exclude said second term from said sum, and means responsive to the condition in which the measured value of pitch angle reaches said predetermined value to switch said switch means from said first state to said second state.

8. An aircraft instrument according to claim 5 wherein said predetermined variable is forward velocity of the aircraft.

9. An aircraft instrument comprising first means for providing a signal dependent upon forward acceleration of the aircraft, second means for providing a signal dependent upon rate of change of pitch attitude of the aircraft, third means for providing a signal dependent upon the pitch attitude of the aircraft, and fourth means responsive to the three signals provided by the first, second and third means to provide a demand for rate of change of pitch attitude which demand is dependent upon difference between said rate of change of pitch attitude and a function dependent upon said acceleration, said fourth means including means responsive to the signal provided by said third means to include in said function until the pitch attitude of the aircraft reaches a predetermined value a term dependent upon the extent to which the pitch attitude of the aircraft differs from said predetermined value.

10. An aircraft instrument according to claim 9 wherein said term dependent upon difference between the predetermined value of pitch attitude and the pitch attitude of the aircraft produces a component of the pitch rate demand which is of a sense to demand increase in pitch rate when the aircraft pitch attitude is less than said predetermined value, and which is larger the larger the difference between them.

11. An aircraft instrument according to claim 9 including means for selectively varying said predetermined value of pitch attitude.

12. An aircraft instrument according to claim 9 wherein said fourth means includes means for providing a signal dependent upon the difference between said rate of change of pitch attitude and said function, and an indicator responsive to the difference signal to provide an indication of at least the sense of said difference.

13. An aircraft instrument according to claim 12 wherein said indicator includes a rotatable member and means responsive to said difference signal for rotating said member at a rate and in a sense dependent upon the magnitude and sense respectively of said difference.

14. An aircraft instrument according to claim 13 wherein said rotatable member is a cylindrical member mounted for rotation about its longitudinal axis and having an optically distinct helical band coaxial therewith for providing an optical effect of movement at a rate and in a sense dependent respectively upon the rate and sense of rotation of the cylindrical member.

15. An aircraft instrument according to claim 12 including means responsive to forward velocity of the aircraft to obscure said indication from view until a preselected value of velocity has been achieved during a take-off maneuver.

16. An aircraft instrument according to claim 9 including means responsive to forward velocity of the aircraft to include in said function a further term dependent upon forward velocity of the aircraft.

17. An aircraft instrument comprising first means for providing a signal dependent upon forward acceleration of the aircraft, second means for providing a signal dependent upon rate of change of pitch attitude of the aircraft, third means for providing a signal dependent upon the forward velocity of the aircraft, and fourth means responsive to the three signals provided by the first, second and third means to provide a demand for rate of change of pitch attitude which demand is dependent upon difference between said rate of change of pitch attitude and a function dependent upon said acceleration, said fourth means including means responsive to the signal provided by said third means to include in said function a term dependent upon the extent to which the forward velocity of the aircraft differs from a predetermined value of forward velocity.

18. An aircraft instrument according to claim 17 wherein said term dependent upon difference between the forward velocity of the aircraft and said predetermined value of forward velocity results in a component of the pitch rate demand which is of a sense to demand increase in pitch rate when the forward velocity of the aircraft exceeds said predetermined velocity, and which is larger the larger the difference between them.

19. An aircraft instrument according to claim 17 including means for selectively varying said predetermined value of forward velocity.

20. An aircraft instrument according to claim 17 wherein in said fourth means includes means for providing a signal dependent upon the difference between said rate of change of pitch attitude and said function, and an indicator responsive to the difference signal to provide an indication of at least the sense of said difference.

21. An aircraft instrument according to claim 20 wherein said indicator includes a rotatable member and means responsive to said difference signal for rotating said member at a rate and in a sense dependent upon the magnitude and sense respectively of said difference.

22. An aircraft instrument according to claim 21 wherein said rotatable member is a cylindrical member mounted for rotation about its longitudinal axis and having an optically distinct helical band coaxial therewith for providing an optical effect of movement at a rate and in a sense dependent respectively upon the rate and sense of rotation of the cylindrical member.

23. An aircraft instrument according to claim 20 including means responsive to forward velocity of the aircraft to obscure said indication from view until a preselected value of velocity has been achieved during a take-off maneuver.

24. An aircraft instrument according to claim 17 wherein said term dependent upon difference between the forward velocity of the aircraft and said predetermined value of forward velocity is also dependent upon the forward acceleration of the aircraft.

25. An aircraft instrument according to claim 17 including means responsive to pitch attitude of the aircraft to include in said function a further term dependent upon said pitch attitude.

26. An aircraft instrument comprising first means for providing a signal dependent upon forward acceleration of the aircraft, means for providing a signal dependent upon rate of change of pitch attitude of the aircraft, and means responsive to both signals to provide an indication dependent upon difference between said rate of change of pitch attitude and a function which is dependent upon the extent to which said acceleration differs from a predetermined value, such that as the forward acceleration of the aircraft tends to said predetermined value the difference between rate of change of pitch attitude and said function reduces towards zero.

27. An aircraft instrument according to claim 26 wherein said function is simply the product of a constant and the difference between the predetermined value of forward acceleration and the forward acceleration of the aircraft.

28. An aircraft instrument according to claim 26 including means for selectively varying said predetermined value of acceleration.

29. An aircraft instrument according to claim 26 including means for providing a signal dependent upon the difference between said rate of change of pitch attitude and said function, and an indicator responsive to the difference signal to provide an indication of at least the sense of said difference.

30. An aircraft instrument according to claim 29 wherein said indicator includes a rotatable member and means responsive to said difference signal for rotating said member at a rate and in a sense dependent upon the magnitude and sense respectively of said difference.

31. An aircraft instrument according to claim 30 wherein said rotatable member is a cylindrical member mounted for rotation about its longitudinal axis and having an optically distinct helical band coaxial therewith for providing an optical effect of movement at a rate and in a sense dependent respectively upon the rate and sense of rotation of the cylindrical member.

32. An aircraft instrument according to claim 29 including means responsive to forward velocity of the aircraft to obscure said indication from view until a preselected value of velocity has been achieved during a take-off maneuver.

33. An aircraft instrument comprising first means for providing a signal dependent upon froward acceleration of the aircraft, second means for providing a signal dependent upon rate of change of pitch attitude of the aircraft, third means for providing a signal dependent upon a predetermined value of forward acceleration, and fourth means responsive to the three signals provided by the first, second and third means to provide a demand for rate of change of pitch attitude which demand is dependent upon difference between said rate of change of pitch attitude and a function dependent upon the extent to which the forward acceleration of the aircraft differs from said predetermined value.

34. An aircraft instrument comprising first means for providing a first signal dependent upon forward acceleration of the aircraft, second means responsive to said first signal to provide a second signal dependent upon the value of the algebraic sum of at least two terms, a first of said two terms having a value which is dependent upon the magnitude of said acceleration, and the second of said two terms having a value which is dependent upon a predetermined value of a predetermined variable, third means for providing a third signal dependent upon rate of change of pitch attitude of the aircraft, and fourth means responsive to said second and third signals to provide an indication of difference between said sum and said rate of change of pitch attitude, said fourth means including a rotatable member, and means responsive to said difference to rotate said member at a rate and in a sense dependent upon the magnitude and sense respectively of said difference.

35. An aircraft instrument comprising first means for providing a first signal dependent upon forward acceleration of the aircraft, second means responsive to said first signal to provide a second signal dependent upon the value of at least two terms, a first of said two terms having a value which is dependent upon the magnitude of said acceleration, and the second of said two terms having a value which is dependent upon a predetermined value of a predetermined, third means for providing a third signal dependent upon rate of change of pitch attitude of the aircraft, and fourth means responsive to said second and third signals to provide an output which is representation of at least the sense of difference between said value of said two terms and said rate of change of pitch attitude, utilization means, and means for coupling said output of said fourth means to said utilization means, said first means comprising an accelerometer for supplying a signal which has a first component dependent upon said acceleration and, inherently, a second component dependent both upon gravity and the pitch attitude of the aircraft, a pitch attitude unit for supplying a signal dependent upon gravity and the pitch attitude, and means responsive to the signals supplied by the accelerometer and the pitch attitude unit to supply a signal dependent upon said first component and substantially independent of said second component of the accelerometer signal.

References Cited

UNITED STATES PATENTS

| | | | |
|---|---|---|---|
| 2,942,864 | 6/1960 | Sikora | 73—504 X |
| 3,148,540 | 9/1964 | Gold | 73—178 |
| 3,200,642 | 8/1965 | Neuendorf et al. | 73—178 |

LOUIS R. PRINCE, *Primary Examiner.*

D. O. WOODIEL, *Assistant Examiner.*